US006189032B1

(12) United States Patent
Susaki et al.

(10) Patent No.: US 6,189,032 B1
(45) Date of Patent: Feb. 13, 2001

(54) CLIENT-SERVER SYSTEM FOR CONTROLLING ACCESS RIGHTS TO CERTAIN SERVICES BY A USER OF A CLIENT TERMINAL

(75) Inventors: Seiichi Susaki; Hisashi Umeki, both of Yokohama; Katsuyuki Umezawa, Kawasaki; Seiji Miyazaki; Kazuo Matsunaga, both of Yokohama; Makoto Kitagawa, Fujisawa, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/015,220

(22) Filed: Jan. 29, 1998

(30) Foreign Application Priority Data

Feb. 27, 1997 (JP) .................................................. 9-043738

(51) Int. Cl.[7] ............................ G06F 15/173; G06F 15/16
(52) U.S. Cl. ............................ 709/225; 709/203; 713/201
(58) Field of Search ................................... 709/216, 217, 709/218, 219, 203, 225, 223; 395/187.01, 188.01; 713/200, 201, 202

(56) References Cited

U.S. PATENT DOCUMENTS

| | | | | |
|---|---|---|---|---|
| 4,757,533 | * | 7/1988 | Allen et al. ............................... | 380/25 |
| 5,319,542 | * | 6/1994 | King, Jr. et al. .......................... | 705/27 |
| 5,361,359 | * | 11/1994 | Tajalli et al. ............................ | 713/200 |
| 5,483,658 | * | 1/1996 | Grube et al. ............................ | 713/200 |
| 5,572,673 | * | 11/1996 | Shurts .................................... | 713/200 |
| 5,729,734 | * | 3/1998 | Parker et al. ............................. | 707/9 |
| 5,748,896 | * | 5/1998 | Daly et al. ............................. | 709/223 |
| 5,815,574 | * | 9/1998 | Fortinsky ................................. | 380/25 |
| 5,835,726 | * | 11/1998 | Shwed et al. ........................... | 709/229 |
| 5,845,068 | * | 12/1998 | Winiger .................................. | 713/200 |
| 5,848,233 | * | 12/1998 | Radia et al. ............................ | 713/201 |
| 5,872,915 | * | 2/1999 | Dykes et al. ...................... | 395/188.01 |
| 5,893,128 | * | 4/1999 | Nauckhoff .............................. | 707/511 |
| 5,898,830 | * | 4/1999 | Wesinger et al. ...................... | 713/201 |
| 5,944,821 | * | 8/1999 | Angelo .................................. | 713/200 |
| 5,987,611 | * | 11/1999 | Freund .................................. | 713/201 |

OTHER PUBLICATIONS

Adam et al., "Security–Control Methods for Statistical Databases: A comparative Study", ACM Computer Surveys, pp. 515–556, Dec. 1989.*

Shackelford et al., "The Architecture and Implemtation of a Distributed Hypermedia Storage System", Hypertext '93 Proceedings, pp. 1–13, Nov. 1993.*

D.E.R. Denning, Cryptography and Data Security, published by Addison–Wesley Publishing Company, Inc.

* cited by examiner

Primary Examiner—Zarni Maung
Assistant Examiner—Jason D. Cardone
(74) Attorney, Agent, or Firm—Mattingly, Stanger & Malur, P.C.

(57) ABSTRACT

A client-server system is provided in which access to a service by a user can properly be controlled, even if an approval by another user is required for receiving the service. First, the server 2 executes a log-in processing by using a user identifier and password transmitted from the client terminal 2, and a user control file 202. Next, the server 2 executes a service control by using a service supply request transmitted from the client terminal 1 and a service control file 42 provided with the server. When the server determines that an approval by another user is required for providing the service, the server executes the approval request to the client terminal 1 that the concerned user uses. When the reply to the approval request is affirmative, the server executes the processing in accordance with the foregoing service supply request. When the reply is negative, the server informs to the user who made the foregoing service supply request that the approval is rejected.

17 Claims, 14 Drawing Sheets

| SERVICE IDENTIFIER | USER AUTHORITY LEVEL | PROCESS CONTROL RULE |
|---|---|---|
| A | 0 | ALWAYS PROCESSIBLE |
| | 1 | APPROVAL BY "TARO" (IS) REQUIRED |
| | 2 | IMPOSSIBLE TO PROCESS |
| | 3 | IMPOSSIBLE TO PROCESS |
| | : | : |
| B | 0 | ALWAYS PROCESSIBLE |
| | 1 | ALWAYS PROCESSIBLE |
| | 2 | ALWAYS PROCESSIBLE |
| | 3 | ALWAYS PROCESSIBLE |
| | : | : |
| C | 0 | ALWAYS PROCESSIBLE |
| | 1 | APPROVAL BY ONE PERSON OF LEVEL 0 (IS) REQUIRED |
| | 2 | APPROVAL BY TWO PERSONS OF LEVEL 0 (IS) REQUIRED |
| | 3 | |
| | : | : |

(table labeled 42)

FIG. 4

| | PASSWORD | USER AUTHORITY LEVEL |
|---|---|---|
| USER IDENTIFIER | 12345678 | 0 |
| TARO | ******** | 2 |
| HANAKO | ******** | 2 |
| SABURO | ******** | 1 |
| JIRO | : | : |

FIG. 5

| SERVICE IDENTIFIER | USER AUTHORITY LEVEL | PROCESS CONTROL RULE |
|---|---|---|
| A | 0 | ALWAYS PROCESSIBLE |
| | 1 | APPROVAL BY "TARO" (IS) REQUIRED |
| | 2 | IMPOSSIBLE TO PROCESS |
| | 3 | IMPOSSIBLE TO PROCESS |
| | : | : |
| B | 0 | ALWAYS PROCESSIBLE |
| | 1 | ALWAYS PROCESSIBLE |
| | 2 | ALWAYS PROCESSIBLE |
| | 3 | ALWAYS PROCESSIBLE |
| | : | : |
| C | 0 | ALWAYS PROCESSIBLE |
| | 1 | APPROVAL BY ONE PERSON OF LEVEL 0 (IS) REQUIRED |
| | 2 | APPROVAL BY TWO PERSONS OF LEVEL 0 (IS) REQUIRED |
| | 3 | |
| | : | : |
| : | : | : |

FIG. 7

| USER IDENTIFIER | USER AUTHORITY LEVEL | CLIENT TERMINAL NAME |
|---|---|---|
| TARO | 0 | CLIENT TERMINAL $1_2$ |
| JIRO | 1 | CLIENT TERMINAL $1_1$ |
| | : | : |

RECEPTION OF APPROVAL REQUEST

USER IDENTIFIER: HANAKO
USER LEVEL: 3
SERVICE IDENTIFIER: 12

RECEIVED ABOVE APPROVAL REQUEST. DO YOU APPROVE?

[APPROVE]　[REJECT]

FIG. 15

SELECTION OF USER

APPROVAL BY ONE PERSON OF THE FOLLOWING USERS IS NECESSARY, IF YOU USE THE SERVICE YOU SPECIFIED. PLEASE, SELECT THE USER.

| USER IDENTIFIER | USER LEVEL |
|---|---|
| JIRO | 2 |
| GORO | 2 |
| ROKURO | 2 |

OK

CANCEL

*FIG. 16*

CLIENT-SERVER SYSTEM FOR CONTROLLING ACCESS RIGHTS TO CERTAIN SERVICES BY A USER OF A CLIENT TERMINAL

FIELD OF THE INVENTION

The present invention relates to a client-server system. In particular, the present invention relates to various services that a server provides to a client terminal, a client-server system that can control the access right to a certain service by a user of a client terminal, and server and client terminals which make up the system.

BACKGROUND OF THE INVENTION

In recent years, due to the advancement of information communication equipment, there has been widespread use of work stations and local area networks (LAN) having personal computers, and the like, mutually connected as terminals. Accompanying this trend, the mode of using computers is shifting from the stand alone type to the client-server type.

Compared to the stand alone type, the client-server system can easily coordinate the work performed by a plurality of users (client terminal users). Furthermore, the client-server system is capable of making the server execute operations requiring advanced processing capacity, thereby relieving client terminals from the burden of having the capability to perform such advanced processing capacity. This results in a significant cost savings.

However, in the client-server system, since a plurality of users use the server through the client terminals, it is necessary to control the access to the particular service by a user in order to avoid leakage of official secrets and falsification of information. This is provided among the various services that the server provides to the users through the client terminals.

Usually, the foregoing access control in the conventional client-server system is performed such that the operating system (OS) of the server employs a control table called the access control list to limit accesses to the directories and files by each of the users or by each of the programs. The method of controlling accesses by the users employing this access control list is represented, for example, by D. E. R. Denning, entitled "Cryptography and Data Security" (published by Addison-Wesley Publishing Company, Inc.). A short description of this material follows.

The state of a system is defined by a set S of subjects s as active entities, a set O of objects o as entities to be protected by the system, and a set R of combinations r of individual access rights such as reading, writing, and executing.

The access to each object $o_i$ is controlled by the access control list $o_i[s_j, r_j]$.

Here, i, j satisfy $0<i<n$, $0<j<m$, respectively; however, n is the number of the factors of the set O (total number of the objects), m is the number of the factors of the set S (total number of the subjects).

Suppose that the object $o_k$ (here, the k is a constant satisfying $0<k<n$) is a file named F, and there are two access control lists set to the object $o_k$, which are called as $o_k$ [user A, reading], and $o_k$ [user B, reading•writing•executing].

In this case, the server permits to user B three types of accesses to the file F, namely, reading, writing, and executing. However, the server permits to user A only one type of access to the file F, reading, and does not permit other accesses.

The present inventors have recognized the following problems in the prior art system. These problems are set forth below. In the conventional client-server system for controlling accesses by the users employing the foregoing access control list, the manager of the server sets the foregoing access control list in the server, and the server is thus made to control accesses by the users to various services that the concerned server provides. In a business organization, when performing a transaction, often times the person in charge of the concerned transaction has to obtain the approval of a superior. Also, there can be instances where the person in charge has to beforehand obtain consent of a plurality of co-workers in charge of the same transaction. These situations can occur as well in the client-server system. That is, when a user uses a service that the server provides through the client terminal, there are cases that the concerned user has to beforehand acquire the approval and consent of another user.

In such cases, in the conventional client-server system for controlling accesses by the users employing the foregoing access control list, the condition for determining the access control is composed of only what kinds of access rights (reading, writing, executing, etc.) each of a plurality of the users (subjects) using the concerned system has. This creates the following problems:

(1) When the access control list is set so as to allow the foregoing user to receive the service, there is a possibility that the concerned user can forget to acquire the approval and consent by another user in advance and access the concerned service. This will not bring about a proper control of accesses by the users.

(2) When the access control list is set so as not to allow the foregoing user to receive the service, a time consuming procedure is necessary whereby the concerned user informs of the approval and consent that have been acquired in advance to the manager of the server, and has the manager modify the access control list so as to be able to use the foregoing service. This imposes a burden on the user and the manager of the server.

Thus, in the conventional client-server system, when a user of the client terminal receives a service that the server provides, the access to the foregoing service by the concerned user cannot properly be controlled if the approval and consent by another user are required.

The present invention has been made in view of the foregoing circumstances, and it is therefore an object of the invention to provide a client-server system, a server, and a client terminal, whereby, even if an approval and consent are required in case a user of the client terminal receives a service that the server provides, the access to the foregoing service by the concerned user can properly be controlled.

SUMMARY OF THE INVENTION

In order to accomplish the foregoing object and others not specifically mentioned, the client-server system of the present invention includes at least one client terminal and at least one server that provides at least one service. The server includes control table storage means for storing a control table to indicate, as to each of at least the foregoing one service, a correspondence between identification information of a plurality of users using the foregoing client terminal or level information of the users specified by the concerned identification information and an approval condition to specify the presence of an approval for receiving the concerned service supply, and in case an approval is required an identification information of at least one user who can give the concerned approval; and service supply control means for controlling a supply of at least the foregoing one service to the foregoing client terminal.

The foregoing client terminal includes input means for receiving an instruction by a user using the concerned client terminal, such as an input of an identification information of a user and a service supply request of a service that the foregoing server provides; and transmission means for transmitting an instruction to the server by the foregoing user that the foregoing input means received.

The foregoing service supply control means includes approval condition retrieval means for retrieving an approval condition specified in correspondence with an identification information of the concerned user or a level information of a user specified by the concerned identification information from the foregoing control table storage means, as to a service specified by the foregoing service supply request by a user using the concerned client terminal, transmitted from the foregoing client terminal; and service supply execution means for executing a processing in accordance with the concerned service supply request, when an approval condition detected by the foregoing approval condition retrieval means indicates that an approval is not required, and when the approval condition thereby detected indicates that an approval is required, executing a processing in accordance with the concerned service supply request after receiving an approval by a user having an identification information of a user specified by the concerned approval condition.

In the client-server system of the present invention, the control table storage means stores the control table which indicates, as to each of the services that the server provides, a correspondence between identification information of a plurality of users using the foregoing client terminal or a level information of a user specified by the concerned identification information and an approval condition to specify the presence of an approval for receiving the concerned service supply and in case of an approval being required an identification information of at least one user who can give the concerned approval.

When a service supply is requested by a client terminal to a service that the server provides, the approval condition retrieval means retrieves an approval condition specified in correspondence with an identification information of a user using the concerned client terminal or a level information of a user specified by the concerned identification information from the foregoing control table storage means. Thereafter, when the approval condition detected indicates that an approval for executing a processing in accordance with the foregoing service supply request is required, the service supply execution means executes a processing in accordance with the concerned service supply request, on the condition of receiving an approval by a user having an identification information specified by the concerned approval condition.

Therefore, according to the present invention, when a user of a client terminal receives a service that the server provides, even if an approval and consent by another user are required, the access to the foregoing service by the concerned user can properly be controlled.

Furthermore, when there are a plurality of the foregoing client terminals, the foregoing service supply control means further includes identification information storage means for storing identification information of users using the concerned client terminals, transmitted from each of a plurality of the foregoing client terminals, so as to correspond with identification information of the concerned client terminals, identification information retrieval means for retrieving, when an approval condition detected by the foregoing approval condition retrieval means indicates that an approval is required, an identification information of a client terminal specified in correspondence with an identification information of a user specified by the concerned approval condition from the foregoing identification information storage means, and informing means for informing that a user at a client terminal that transmitted the foregoing service supply request executed the concerned service supply request to a client terminal specified by an identification information of a client terminal detected by the foregoing identification information retrieval means.

The foregoing input means also receives an input of an approval consent information for specifying to approve or not approve a processing in accordance with a service supply request informed by the foregoing informing means. The foregoing service supply execution means preferably executes a processing in accordance with the concerned service supply request, when an approval condition detected by the foregoing approval condition retrieval means indicates that an approval is required, and only when the foregoing approval consent information transmitted from a client terminal specified by an identification information detected by the foregoing identification information retrieval means indicates to approve a processing in accordance with the foregoing service supply request.

With the system thus arranged, the user who can give the approval to the service supply request informs the server whether or not the concerned approval is given through the client terminal, thereby determining to or not to execute a processing in accordance with the foregoing service supply request. Therefore, when an approval is required for a service supply request, the client-server system according to the invention can reduce the burden imposed on the user who requested the concerned service and the manager of the server, compared to the conventional client-server system.

The server of the present invention provides at least one service to a client terminal, and the server includes control table storage means for storing a control table to indicate, as to each of at least the foregoing one service, a correspondence between identification information of a plurality of users using the foregoing client terminal or level information of the users specified by the concerned identification information and an approval condition to specify the presence of an approval for receiving the concerned service supply and in case of an approval being required an identification information of at least one user who can give the concerned approval, and service supply control means for controlling a supply of at least the foregoing one service to the foregoing client terminal.

Furthermore, the foregoing service supply control means includes approval condition retrieval means for retrieving an approval condition specified in correspondence with an identification information of the concerned client terminal or a level information of a user specified by the concerned identification information from the foregoing control table storage means, as to a service supply request of a service transmitted from the foregoing client terminal; and service supply execution means for executing a processing in accordance with the concerned service supply request, when an approval condition detected by the foregoing approval condition retrieval means indicates that an approval is not required, and when the approval condition thereby detected indicates that an approval is required, executing a processing in accordance with the concerned service supply request after receiving an approval by a user having an identification information of a user specified by the concerned approval condition.

The client terminal of the present invention includes input means for receiving an instruction by a user using the concerned client terminal, such as an input of an identification information of a user and a service supply request of a service that a server provides, transmission means for transmitting an instruction by the foregoing user that the foregoing input means received to the foregoing server, and display means for displaying an information relating to a service supply request made by a user at another client terminal, informed from the foregoing server.

The client terminal receives a service that the foregoing server provides, in which the foregoing input means also receives, as to a service supply request displayed on the foregoing display means made by a user at another client terminal, an input of an approval required for the foregoing server executing a processing in accordance with the concerned service supply request.

These and other objects, features and advantages of the present invention will be readily apparent in view of the following detailed description of the present invention in conjunction with the drawings.

BRIEF DESCRIPTION OF THE DRAWINGS

FIG. 4 is one example of information stored in the user control file shown in FIG. 3;

FIG. 5 is one example of information stored in the service control file shown in FIG. 3;

FIG. 7 is one example of a user information list stored in the log-in control table shown in FIG. 6;

FIG. 15 illustrates one example of a display screen on the display portion of the client terminal, when the approval request is made; and FIG. 16 illustrates one example of a display screen on the display portion of the client terminal, when the user who has made a service supply request must select the users to whom the approval for the concerned service supply is to be requested.

DETAILED DESCRIPTION OF THE PREFERRED EMBODIMENTS

The preferred embodiments of the present invention will now be described in conjunction with the drawings.

Figure 1:
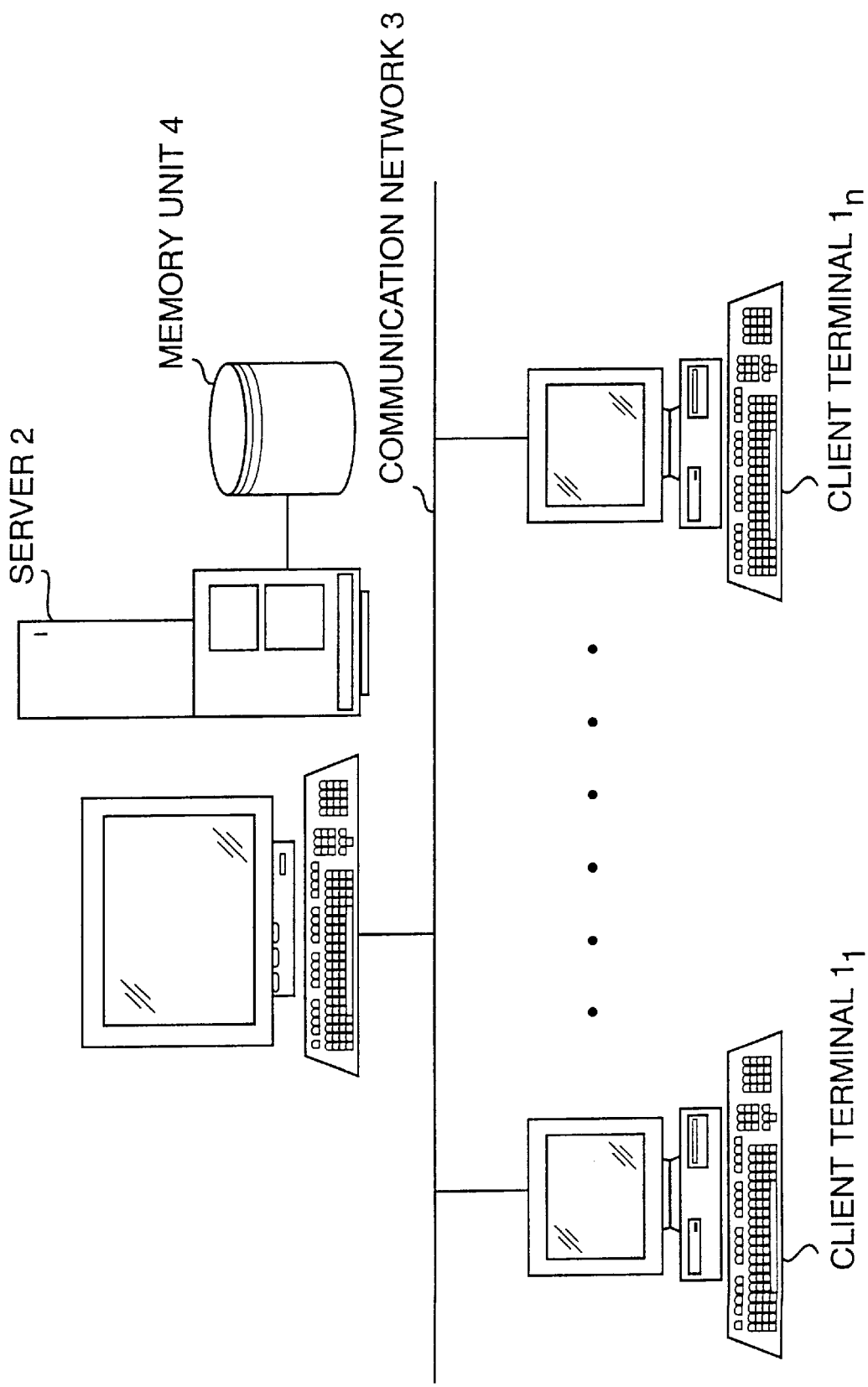
FIG. 1 illustrates a schematic configuration of a client-server system according to one embodiment of the present invention.

FIG. 1 illustrates a schematic configuration of a client-server system according to one embodiment of the present invention. The client-server system of the embodiment is configured, as shown in FIG. 1, with client terminals $1_1 \sim 1_n$ (hereinafter also referred to as client terminal 1) and a server 2 mutually connected through a communication network 3 such as a LAN. The server 2 provides various services to the client terminal 1. The services mentioned above means that the server 2 permits the client terminal 1 to access (for example, read out, write in, execute) an object (such as a file) owned by the server 2, or to utilize resources owned by the server 2.

Users are able to receive through the client terminal 1 various services that the server 2 provides. The data exchange between the client terminal 1 and the server 2 is executed through the communication network 3.

Further, the server 2 is connected to a memory 4 for storing a user control file for controlling users who use the client terminal 1 and a service control file for controlling the various services that the server 2 provides. The user control file and service control file are described in more detail later.

Figure 2:
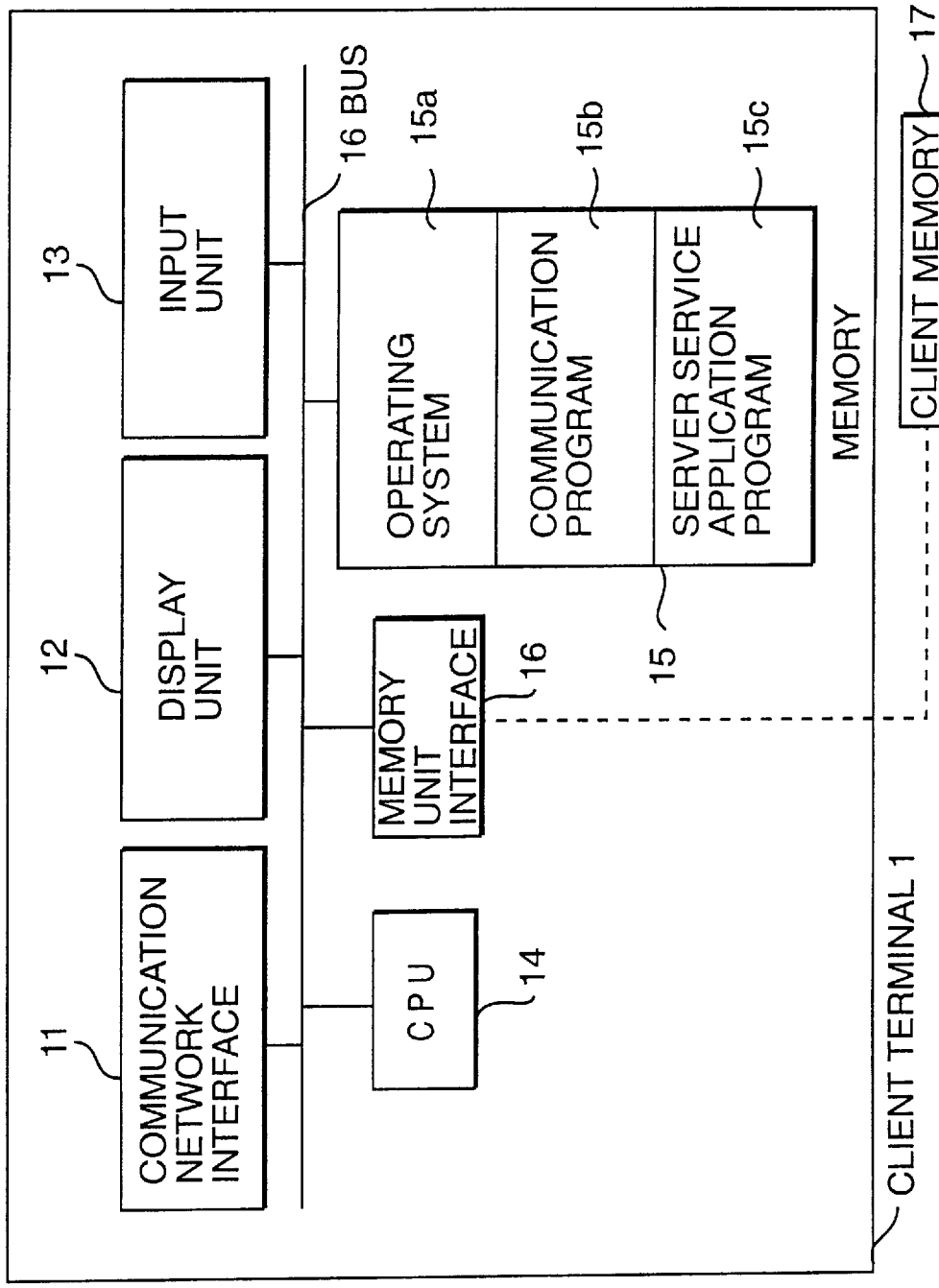
FIG. 2 illustrates a hardware configuration of the client terminal 1 shown in FIG. 1.

FIG. 2 illustrates a hardware configuration of the client terminal 1. The hardware configuration of the client terminal 1 in this embodiment is made such that a communication network interface 11, display 12, input unit 13, central processing unit (CPU) 14 and memory 15 are connected to each other by bus 16. The communication network interface 11 is an interface for exchanging data with the server 2 through the communication network 3.

The display 12 is used for displaying messages, etc. to users of the client terminal 1. Display 12 may be a CRT or a liquid crystal display. The input unit 13, which can be a keyboard or a mouse, etc., is used when a user of the client terminal 1 enters data or commands. The memory unit interface 16 acts as an interface between the client terminal and client memory 17, which stores client programs. Memory 17 may be a magnetic hard disk, floppy disk, optical disk, or the like. Client programs are either sent from a server, optionally through another server, or can be supplied by disk. The CPU 14 chiefly controls the parts configuring the client terminal 1, or performs various processings. The memory 15 stores programs such as an OS (operating system) 15a, communication program 15b, or server service utilization program 15c which are required for the CPU 14 to execute the foregoing processings.

The OS 15a is a program for executing a function such as a file control, process control, or device control, in order to totally control the client terminal 1. The communication program 15b is a program for the client terminal 1 exchanging data with the server 2.

The server service application program 15c is a program for controlling all the processings required when receiving the various services that the server 2 provides. Further, the memory 15 may be a main storage such as a ROM or RAM, or an external storage such as a hard disk, floppy disk, or CD-ROM.

Figure 3:
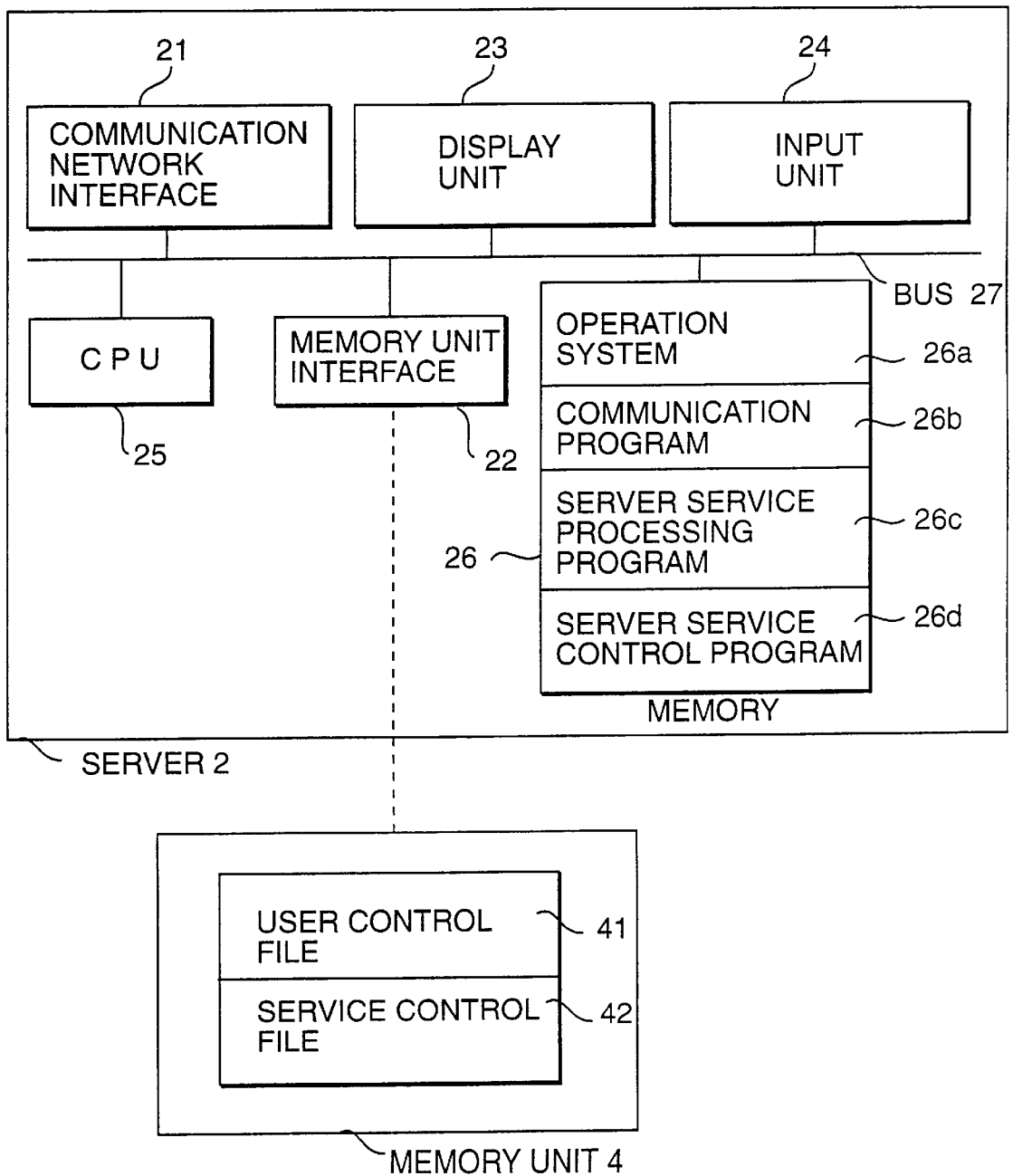
FIG. 3 illustrates a hardware configuration of the server 2 shown in FIG. 1.

FIG. 3 illustrates a hardware configuration of the server 2. The hardware configuration of the server 2 in this embodiment is made such that a communication network interface 21, memory interface 22, display unit 23, input unit 24, central processing unit (CPU) 25 and memory 26 are connected to each other by bus 27, as shown in FIG. 3. The communication network interface 21 is an interface for exchanging data with the client terminal 1 through the communication network 3. The memory interface 22 is an interface for exchanging data with the memory 4. The display unit 23 is used for displaying messages, etc. to the system manager. the display unit 23 may be a CRT or a liquid crystal display. The input unit 24, such as a keyboard or a mouse, is used when the system manager replenishes, deletes, or updates the contents of a user control file 41 or service control file 42 stored in the memory 4.

The CPU 25 chiefly controls the parts configuring the server 2 and the memory 4, and performs various processings. The memory 26 stores programs such as an OS (operating system) 26a, communication program 26b, server service utilization program 26c, or server service control program 26d which are required for the CPU 25 executing the foregoing processings. Here, the OS 26a is a program for executing a function such as a file control, process control, or device control, in order to control the entire server 1 and the memory 4. The communication program 26b is a program for the server 2 exchanging data with the client terminal 1. The server service processing program 26c is a program for providing the services to the concerned client terminal 1 in response to the service request made by the user of the concerned client terminal 1, transmitted from the client terminal 1.

The server service control program 26d is a program for controlling whether or not the CPU 25 executes the server service processing program 26c. Further, the memory 26 may be a main storage such as a ROM or RAM, or an external storage such as a hard disk, floppy disk, or CD-ROM. Next, the user control file 41 and service control file 42 stored in the memory 4 shown in FIG. 3 will be described.

FIG. 4 is one example of information stored in the user control file 41. The user control file 41 is a file for controlling users who can use the client terminal 1 and receive the services that the server 2 provides. As shown in FIG. 4, the concerned file 41 stores a table in which user identifiers, passwords, and user authority levels of a plurality of users using the client terminal 1 are specified. The user identifier and the password are necessary data for creating an environment in which the user can receive the services that the server 2 provides through the client terminal 1, that is, data necessary for logging in the client-server system in this embodiment. The user authority level is data given to the user having the user identifier and the password specified accordingly and is used to determine the condition when the concerned user uses the services.

FIG. 5 is one example of an information stored in the service control file 42. The service control file 42 is a file for controlling the services that the users of the client terminal 1 can use. As shown in FIG. 5, the file 42 stores a table in which service identifiers of the services that the server 2 provides, user authority levels shown in FIG. 4, and process control rules are specified. The service identifier is a data for specifying a service that a user of the client terminal 1 requested. The process control rule is a data to determine whether the supply of the service specified by the service identifier specified in correspondence with the process control rule is possible or not, and if it is possible, whether approval by another user is needed or not.

In the example shown in FIG. 5, the service specified by the service identifier "A" is indicated to be "always available" for the users of the user authority level "0", and to be available for the users of the user authority level "1" when "the approval by a user having the user identifier 'taro' is acquired". Furthermore, the service is indicated to be not available for the users of the user authority level "2" and "3". Preferably, user control file 41 and the service control file 42 are made accessible only for the manager of the client-server system in this embodiment and inaccessible for the users of the client terminal 1, from the view point of preventing fraudulent accesses and leakage of official secrets.

Figure 6:
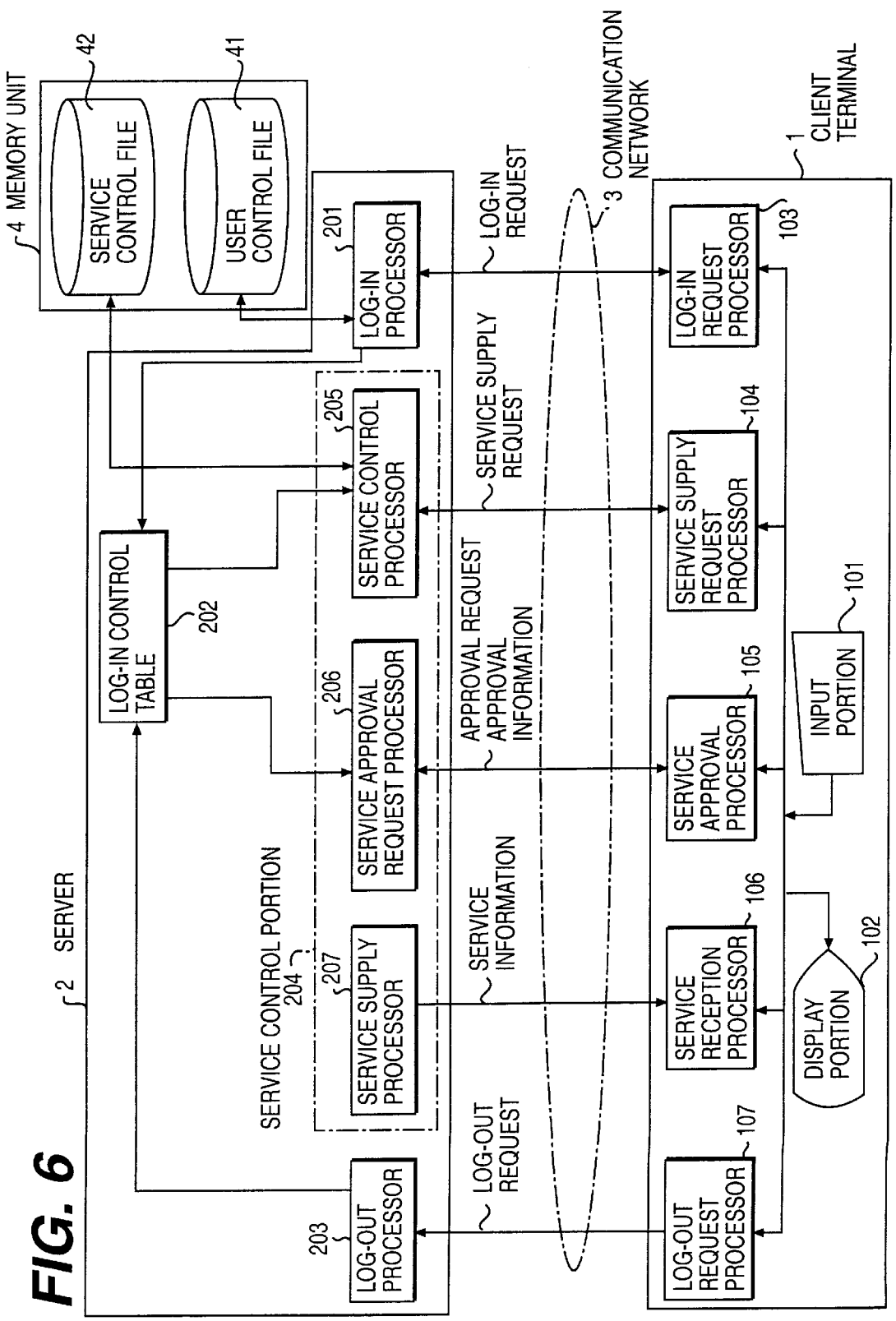
FIG. 6 illustrates a configuration of functional blocks in the client-server system shown in FIG. 1.

Next, the configuration of the functional blocks of the client terminal 1 and the server 2 configuring the client-server system in this embodiment will be described with reference to the drawings. FIG. 6 illustrates the configuration of the functional blocks of client terminal 1 and server 2. Here, the functions of the blocks of the client terminal 1 are achieved by the CPU 14 of the client terminal 1 executing the programs 15a~15c stored in memory 15. And, the functions of the blocks of server 2 are achieved by CPU 25 of server 2 executing programs 26b~26d stored in memory 26.

First, the configuration of the functional blocks of the client terminal 1 will be described. As shown in FIG. 6, the client terminal 1 includes an input portion 101 for receiving an instruction by a user of the client terminal 1, a display portion 102 for displaying information transmitted from the server 2, a log-in request processor 103 for requesting a log-in to the server 2 in accordance with an instruction by a user inputted to the input portion 101, a service supply request processor 104 for providing a desired service to the server 2 in accordance with an instruction by a user inputted to the input portion 101, a service reception processor 105 for executing the reception processing of a service provided by the server 2, a service approval processor 106 for executing a processing to approve or not approve a service supply request made by another user (except for the user using this client terminal 1), and a log-out request processor 107 for requesting a log-out to the server 2 in accordance with an instruction by a user inputted to the input portion 101. The log-in request processor 103 transmits to the server 2 a log-in request including the user identifier and password of the concerned user inputted to input portion 101 by the user and the identifier of client terminal 1. The service supply request processor 104 transmits to server 2 a supply request of a service that the server 2 provides, inputted to the input portion 101 by a user, including the identifier of the client terminal 1 in the concerned request. The service approval processor 105 displays on display portion 102 the approval request being a request for judging to approve or not approve a service supply request made by another user transmitted from server 2, so as to prompt the user to judge to approve or not approve the service supply request made by the concerned another user. The processor 105 transmits to server 2 an approval information indicating a judgment to approve or not approve the foregoing service supply request inputted to input portion 101. The service reception processor 106 displays on display portion 102 service information transmitted from server 2, or information determined by the concerned service information, which is provided to the users. The log-out request processor 107 transmits to server 2 a log-out request inputted to input portion 101 by a user, including the identifier of client terminal 1 in the concerned request.

Next, the configuration of the functional blocks of the server 2 will be described. As shown in FIG. 6, the server 2 includes a log-in processor 201 for executing a log-in processing in accordance with a log-in request transmitted from client terminal 1, a log-in control table 202 for storing information on the users of client terminal 1 who are logged in, a log-out processor 203 for executing a log-out processing in accordance with a log-out request transmitted from client terminal 1, and a service control portion 204 for controlling supply of services to client terminal 1. The log-in processor 201 retrieves the user identifier and the password of the concerned client terminal 1 contained in a log-in request transmitted from client terminal 1, from a table stored in advance in the user control file 41 of the memory 4, as shown in FIG. 4. If log-in processor 201 was able to detect the user identifier and the password from the foregoing table, log-in processor 201 transfers the concerned user identifier, the user authority level specified in correspondence with the concerned user identifier and the password, and the identifier of client terminal 1 contained in the foregoing log-in request to log-in control table 202.

On the other hand, if log-in processor 201 was not able to detect the user identifier and the password from the foregoing table, log-in processor 201 informs that it is unable to log in to client terminal 1 that transmitted the foregoing log-in request. The log-in control table 202 stores a list of user information in which the user identifier, the user authority level, and the identifier of client terminal 1 which are transmitted from the log-in processor 201 are combined into a set.

FIG. 7 illustrates one example of a user information list stored in log-in control table 202. This user information list is used when service control portion 204 described later controls to provide the services.

The log-out processor 203 deletes from the user information list stored in log-in control table 202 a user information which is composed of the identifier of concerned client terminal 1 contained in a log-out request transmitted from the client terminal 1 and the user identifier and user authority level specified in correspondence with the concerned identifier. The service control portion 204 controls the services provided to client terminal 1 and includes a service control processor 205, service approval request processor 206, and service supply processor 207. The service control processor 205 retrieves the user authority level specified in correspondence with the identifier of the concerned client terminal 1 contained in a service supply request transmitted from the client terminal 1, from the log-in control table 202. Next, the service control processor 205 retrieves the process control rule specified in correspondence with the user authority level detected and the service identifier determined by the foregoing service supply request from a table stored in advance in the service control file 42 of the memory 4, as shown in FIG. 5. The service control processor 205 transmits the process control rule detected, including the identifier of concerned client terminal 1 contained in the foregoing service supply request and the service identifier determined by the foregoing service supply request, to service approval request processor 206. The service approval request processor 206 analyzes the process control rule transmitted from service control processor 205. Service approval request processor 206 executes a processing in accordance with the analyzed result.

If the process control rule indicates that an approval is not required, for example, service approval request processor 206 transfers to service supply processor 207 the identifier of client terminal 1 and the service identifier transmitted with the concerned process control rule from service control processor 205. Also, service approval request processor 206 instructs the service supply processor 207 to provide a service determined by the concerned service identifier to a client terminal 1 specified by the identifier of the concerned client terminal 1.

If the process control rule indicates that an approval by a user is required, service approval request processor 206 transmits an approval request for requesting a judgment to approve or not approve that the user of client terminal 1 who transmitted the foregoing service supply request receives a service determined by the concerned service supply request to the client terminal 1 that the concerned user uses. If the client terminal 1 to which the approval request is transmitted sent back an approval information indicating approval, the service approval request processor 206 transfers to the service supply processor 207 the identifier of the client terminal 1 and the service identifier transmitted with the concerned process control rule from service control processor 205, and instructs service supply processor 207 to provide a service determined by the concerned service identifier to a client terminal 1 specified by the identifier of the concerned client terminal 1.

On the other hand, if the client terminal 1 to which the approval request is transmitted returned approval information indicating not to approve, service approval request processor 206 informs of the service supply being disapproved to a client terminal 1 specified by the identifier of client terminal 1 transmitted with the concerned process control rule from service control processor 205. If the process control rule indicates that the service supply is rejected, service approval request processor 206 informs to a client terminal 1 specified by the identifier of client terminal 1 transmitted with the concerned process control rule from service control processor 205 that the supply of the service specified by the service identifier transmitted at the same time with the concerned process control rule was rejected. The service supply processor 207 executes a service specified by the service identifier transmitted from service approval request processor 206. Service supply processor 207 provides the execution result, and the like, to a client terminal 1 specified by the identifier of client terminal 1 transmitted with the concerned service identifier.

Figure 8:
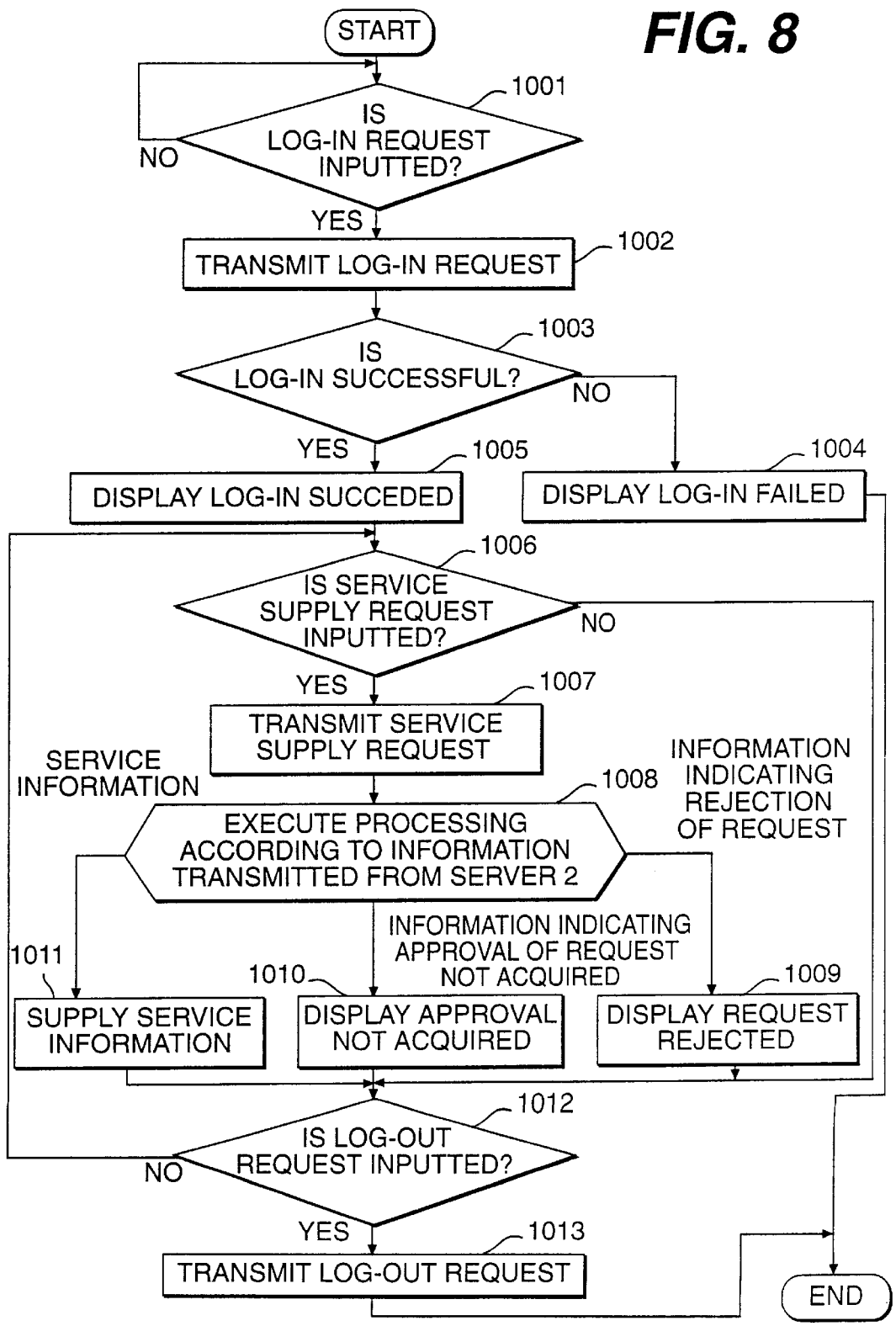
FIG. 8 is a flow chart for explaining the operation of the client terminal shown in FIG. 6, in case a user requests a service supply to the server.

Next, the operation of the client-server system in this embodiment will be described. First, the operation of client terminal 1 will be described when a user requests a service supply to server 2. FIG. 8 is a flow chart for explaining the operation of the client terminal 1 in case a user requests a service supply to the server 2. As a user enters the user identifier and the password of the concerned user (step 1001) into the input portion 101, the log-in request processor 103 transmits to the server 2 a log-in request that includes the user identifier, the password, and the identifier of the client terminal 1 being used by the user (step 1002). Next, the log-in request processor 103 receives a log-in information, transmitted from the server 2, that indicates whether or not to permit a log-in. If the log-in information indicates to permit the log-in, log-in request processor 103 displays on display portion 102 that the log-in is permitted (step 1005), and thereafter the process moves to step 1006 (step 1003).

On the other hand, if the log-in information indicates to not permit log-in, the log-in request processor 103 displays on the display portion 102 that log-in is not permitted (step 1004), and thereafter the process ends. In this case, the user of the client terminal 1 cannot receive the services that the server 2 provides.

At step 1006, when the user inputs to input portion 1041 an instruction to request for a service supply that server 2 provides, service supply request processor 104 transmits to server 2 the identifier of client terminal 1 being used by the user, in addition to the supply request for the concerned service (step 1007).

If the user executes a read-in request for a file that server 2 possesses, service supply request processor 104 transmits to server 2 the concerned request with the identifier of client terminal 1 being used by the user.

Further, at step 1006, if the service supply request is not inputted, the process moves to step 1012.

Next, client terminal 1 executes a processing in accordance with an information transmitted from server 2 (step 1008). If the information transmitted from server 2 indicates not to permit the service supply request transmitted at step 1007, service supply request processor 104 displays on display portion 102 that the request was rejected (step 1009), and thereafter the process moves to step 1012. If the information transmitted from server 2 indicates that an approval for permitting the service supply request transmitted at step 1007 was not acquired, service supply request processor 104 displays that approval was not acquired (step 1010), and thereafter the process moves to step 1012.

Figure 14:
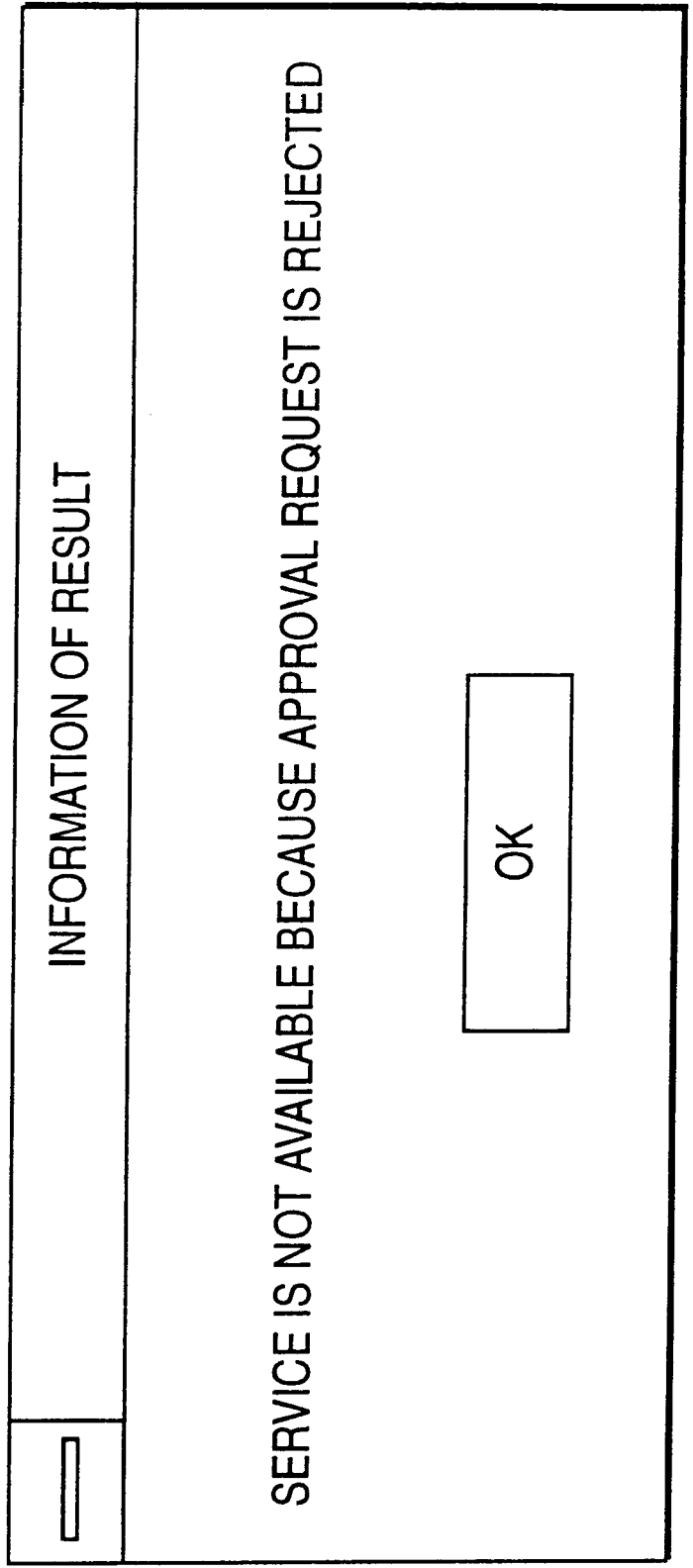
FIG. 14 illustrates one example of a display screen on the display portion of the client terminal that made the concerned service supply request, when the approval for permitting the service supply request was not acquired.

FIG. 14 illustrates one example of a display screen on display portion 102 of client terminal 1 that requested the concerned service supply, when the approval for permitting the service supply request was not acquired. If the information transmitted from server 2 is the service information provided in accordance with the service supply request transmitted at step 1007, service supply request processor 104 displays on display portion 102 this service information or information specified by this service information, which is provided to the user (step 1011), and thereafter the process moves to step 1012 (step 1009). Then, if the user inputs a log-out request to input portion 101 (step 1012), log-out request processor 107 transmits the log-out request including the identifier of client terminal 1 being used by the user to server 2 (step 1013), thereby ending the process. On the other hand, if a log-out request is not yet inputted, the process returns to step 1006.

Figure 9:
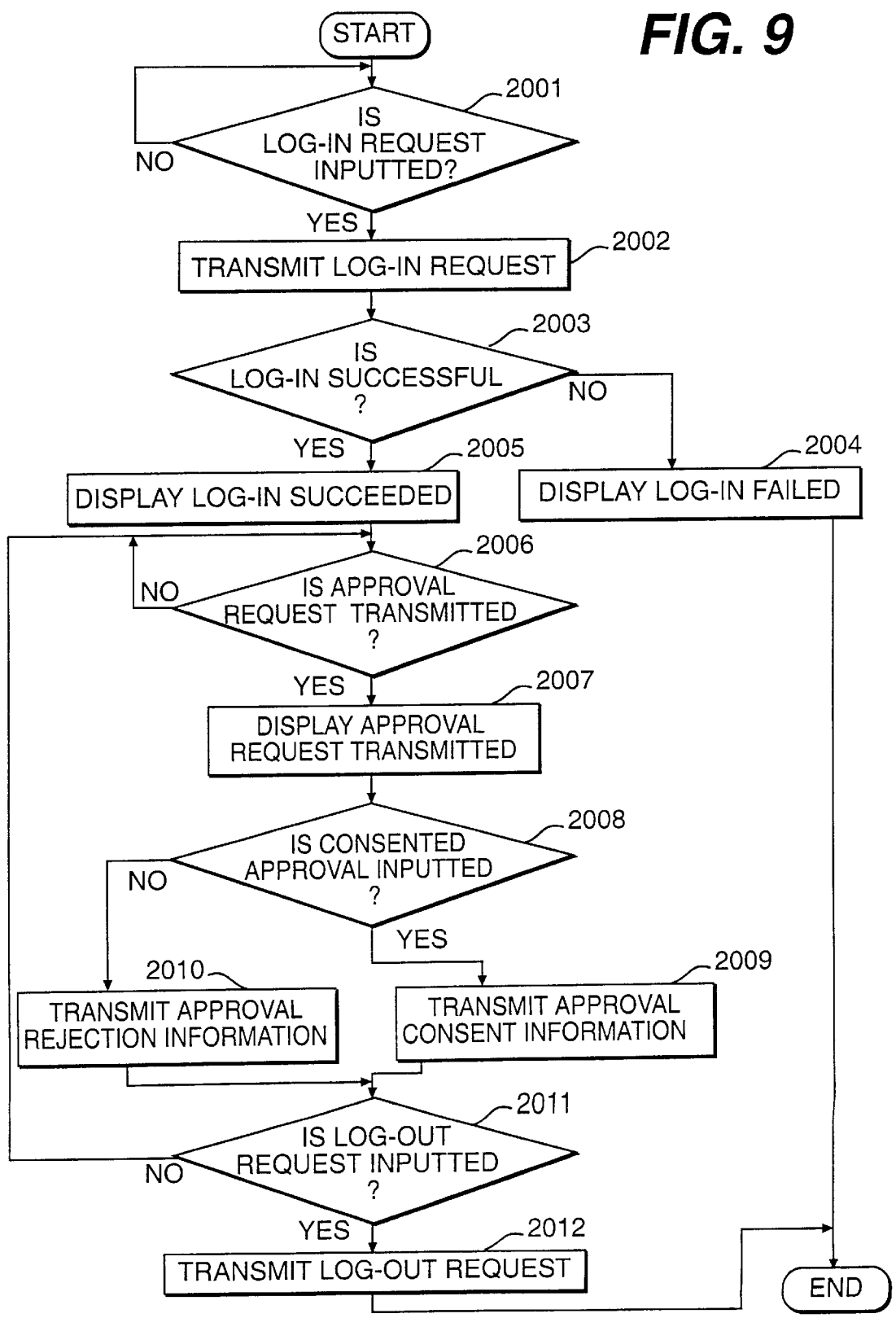
FIG. 9 is a flow chart for explaining the operation of the client terminal shown in FIG. 6, in case a user approves or does not approve a service supply request made by another user.

Next, the operation of the client terminal 1 will be described when the user determines whether or not to approve a service supply request made by another user. FIG. 9 is a flow chart of the operation of the client terminal 1 in this situation. Steps 2001~2005 indicate processes required for the client terminal 1 logging in, which are equivalent to the steps 1001~1005 in the flow shown in FIG. 8. Therefore, if a user of the client terminal 1 failed in the log-in, the user of the client terminal 1 cannot give the approval to the service supply request made by another user using another client terminal 1. At the step 2006, service approval processor 105 judges whether or not the approval request for the service supply request made by another user using another client terminal 1 is transmitted from the server 2. If the approval request is transmitted, the process moves to the step 2007. If the approval request is not transmitted, the process moves to step 2011. At step 2007, service approval processor 105 displays on display portion 102 that the approval request is made, and prompts a judgment to approve or not approve the service supply request made by another user specified by the concerned approval request.

FIG. 15 illustrates one example of a display screen on the display portion 102 when the approval request is made. This example displays the identifier of a user who made the service supply request, user authority level, and identifier of the service being the object of the service supply request, which prompts to select a button to permit or not permit the approval request. Next, the service approval processor 105 judges whether or not the user selected the consent to the concerned approval request as to the approval request displayed at step 2007 (step 2008). If the user consents to the concerned approval request, service approval processor 105 transmits to server 2 an approval consent information indicating consent to the concerned approval request as well as the identifier of client terminal 1 being used by the user (step 2009). On the other hand, if the user rejects the concerned approval request, service approval processor 105 transmits to server 2 an approval rejection information indicating that the concerned approval request was rejected, with the identifier of client terminal 1 being used by the user (step 2010).

Thereafter, if the user inputs a log-out request into input portion 101 (step 2011), log-out request processor 107 transmits the log-out request including the identifier of client terminal 1 being used by the user to server 2 (step 2012), thereby ending the process. On the other hand, if a log-out request is not yet inputted, the process returns to step 2006.

Figure 10:
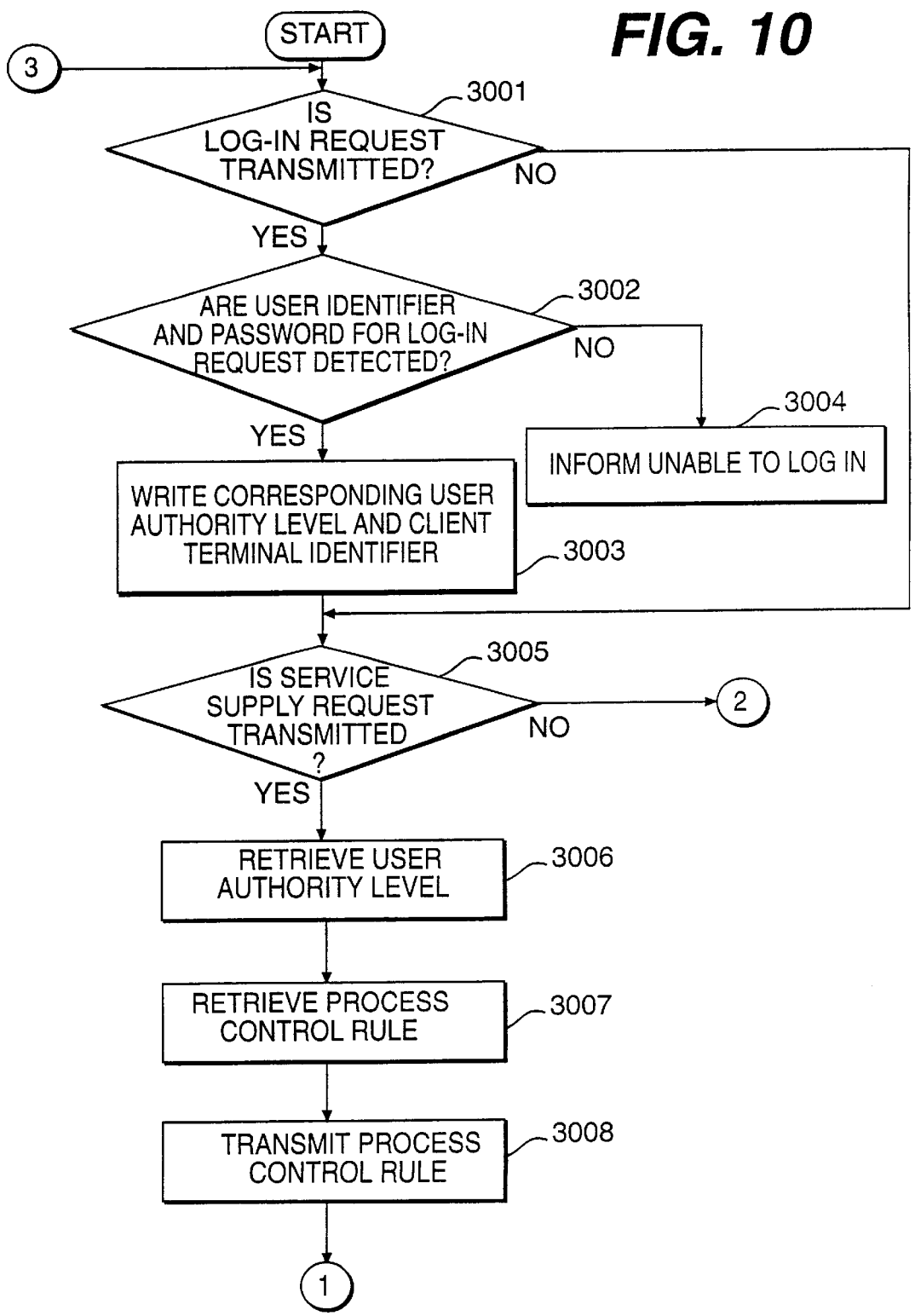
FIG. 10 is a flow chart for explaining the operation of the server shown in FIG. 6.

Next, the operation of the server 2 will be described along with the flow charts of FIG. 10 and FIG. 11. First, in the flow chart shown in FIG. 10, the log-in processor 201 judges whether or not a log-in request is transmitted from client terminal 1 (step 3001). If a log-in request is transmitted, the process moves to the step 3002; if not, the process moves to the step 3005.

At the step 3002, the log-in processor 201 retrieves the user identifier and the password of the client terminal 1 contained in a log-in request received at step 3001, from a table stored in advance in user control file 41 of memory 4. If log-in processor 201 was able to detect the user identifier and the password from the foregoing table, log-in processor 201 transfers the concerned user identifier, the user authority level specified in correspondence with the concerned user identifier and the password, and the identifier of client terminal 1 contained in the foregoing log-in request to log-in control table 202 to store therein (step 3003). If the table stored in the user control file 41 is the one shown in FIG. 4, the user identifier and the password of the client terminal 1 contained in a log-in request received at the step 3001 are "taro" and "12345678", respectively, and the identifier of the client terminal 1 is "12". In this case, the log-in processor 201 transfers the user identifier "taro", user authority level "0", and identifier "12" of the client terminal 1 to the log-in table 202 to store therein. On the other hand, if the log-in processor 201 was not able to detect the user identifier and the password from the foregoing table, the log-in processor 201 informs that it is unable to log in to the client terminal 1 that transmitted the foregoing log-in request (step 3004).

At step 3005, the service control processor 205 judges whether or not the service supply request is transmitted from the client terminal 1. If the service supply request is transmitted, the process moves to step 3006; if not, the process moves to step 3020 in the flow chart of FIG. 11. At the step 3006, the service control processor 205 retrieves the user authority level specified in correspondence with the identifier of the client terminal 1 contained in a service supply request received at step 3005, from the log-in control table 202. Service control processor 205 retrieves the process control rule specified in correspondence with the user authority level detected and the service identifier specified by the foregoing service supply request, from a table stored in advance in the service control file 42 of memory 4 (step 3007). Suppose that the table stored in the log-in control table 202 is the one shown in FIG. 7, the table stored in the service control file 42 is the one shown in FIG. 5, the identifier of the client terminal 1 contained in the service supply request received at the step 3005 is "11", and the service identifier specified by the concerned service supply request is "A". In this case, first the service control processor 205 detects the user authority level "1" specified in correspondence with the identifier "11" of the client terminal 1 and the user identifier "jiro" from the table shown in FIG. 7.

Next, the service control processor 205 detects the process control rule "approval by 'taro' is necessary" which is specified in correspondence with the user authority level "1" detected and the service identifier "A" from the table shown in FIG. 5. Next, the service control processor 205 transmits the process control rule detected at step 3007, including the identifier of the client terminal 1 contained in the service supply request received at step 3005 and the service identifier specified by this service supply request, to service approval request processor 206 (step 3008).

Figure 11:
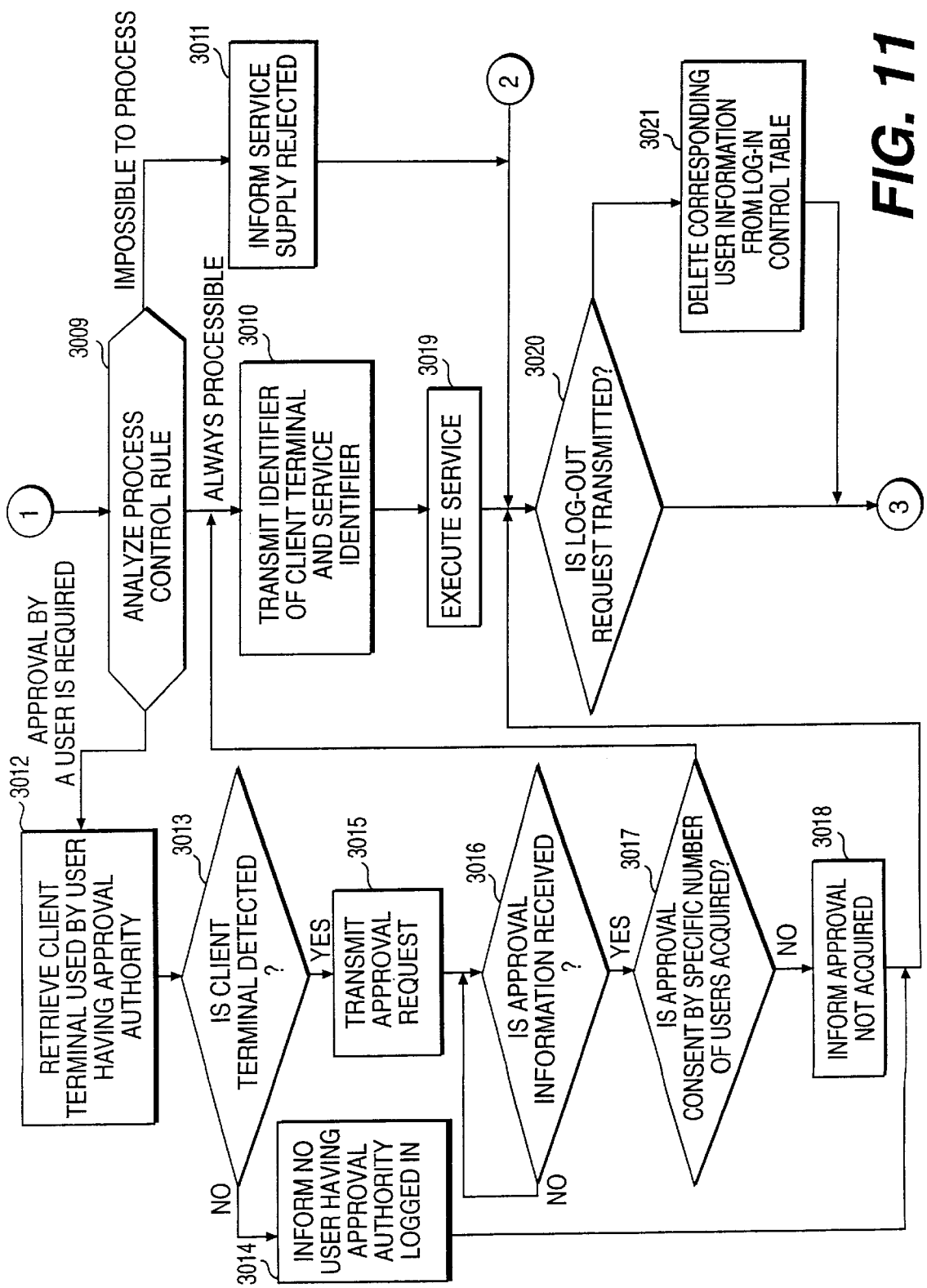
FIG. 11 is a flow chart for explaining the operation of the server shown in FIG. 6.

Thereafter, the process moves to step 3009 in the flow chart of FIG. 11. At the step 3009, the service approval request processor 206 analyzes the process control rule transmitted from service control processor 205 at step 3008. Service approval request processor 206 executes a processing in accordance with the analyzed result. If the process control rule indicates that an approval is not required for a supply of the service specified in correspondence with the concerned process control rule, service approval request processor 206 transfers to service supply processor 207 the identifier of client terminal 1 and the service identifier which are transmitted from service control processor 205 at step 3008 (step 3010). If the identifier of client terminal 1 is "12", the service identifier is "A", and the process control rule is "always processible", which are transmitted from service control processor 205 at step 3008, service approval request processor 206 transfers the service identifier "A" and identifier "12" of client terminal 1 to service supply processor 207. If the process control rule analyzed indicates that the supply of the service specified in correspondence with the concerned process control rule is rejected, the service approval request processor 206 informs of the service supply being rejected to a client terminal 1 specified by the identifier of client terminal 1 transmitted from service control processor 205 (step 3011), and thereafter the process moves to step 3020.

If the identifier of the client terminal 1 is "13", the service identifier is "A", and the process control rule is "impossible to process", which are transmitted from service control processor 205 at step 3008, service approval request processor 206 informs to a client terminal 1 specified by the identifier "13" of client terminal 1 that the supply of the service specified by the service identifier "A" is rejected. Furthermore, if the process control rule analyzed indicates that the supply of the service specified in correspondence with the concerned process control rule requires approval by a user, the service approval request processor 206 retrieves the identifier of client terminal 1 that the concerned user uses from a table stored in the log-in control table 202 (step 3012), and thereafter the process moves to step 3013.

Suppose, for example, that a table stored in the log-in control table 202 is the one shown in FIG. 7. If the identifier of the client terminal 1 is "11", the service identifier is "C", and the process control rule is "approval by persons of level 0 is necessary", which are transmitted from service control processor 205 at step 3008, service approval request processor 206 detects all of client terminals 1 specified in correspondence with the user authority level "0" from the table shown in FIG. 7. If the identifier of client terminal 1 is "11", the service identifier is "A", and the process control rule is "approval by 'taro' is necessary", which are transmitted from service control processor 205 at step 3008, service approval request processor 206 detects the client terminal "12" specified in correspondence with the user identifier "taro" from the table shown in FIG. 7.

At step 3013, service approval request processor 206 judges whether or not the necessary number of client terminals 1 could be detected at step 3012. If a table stored in log-in control table 202 is the one shown in FIG. 7 and the process control rule transmitted from service control processor 205 at step 3008 is "approval by persons of level 0 is necessary", service approval request processor 206 judges whether or not the client terminals 1 specified in correspondence with the user authority level "0" could be detected. If the process control rule transmitted from the service control processor 205 at step 3008 is "approval by 'taro' is necessary", the service approval request processor 206 judges whether or not client terminal 1 specified in correspondence with the user identifier "taro" could be detected. If the service approval request processor 206 was not able to detect the necessary number of the client terminals, service approval request processor 206 informs that the number of users required for acquiring approval of the concerned service supply request are not logged in to the client terminal 1 that transmitted the service supply request at step 3005 (step 3014), and thereafter the step moves to step 3020.

On the other hand, if the service approval request processor 206 was able to detect the necessary number of the client terminals, the service approval request processor 206 requests to the concerned client terminal 1 detected a judgment to approve or not approve that the user who transmitted the service supply request at step 3005 receives the service specified by the concerned service supply request (step 3015). Thereafter, the service approval request processor 206 waits for a reply (approval information) from the client terminal 1 that made the approval request (step 3016). Next, the service approval request processor 206 judges whether or not the approval consent information was acquired from the user indicated on the process control rule or from the number of users indicated on the process control rule (step 3017). If it is acquired, the process moves to step 3010. On the other hand, if it is not acquired, the service approval request processor 206 informs of the approval being not acquired to the client terminal 1 that transmitted the service supply request at step 3005 (step 3018), and thereafter the process moves to step 3020.

After executing the processing at step 3010, at step 3011, the service supply processor 207 executes a service specified by the service identifier transmitted from service approval processor 206 at step 3010 and provides the foregoing service to a client terminal 1 specified by the identifier of the client terminal 1 transmitted at the same time from the service approval request processor 206. Thereafter, the process moves to step 3020.

At step 3020, the log-out processor 203 judges whether or not a log-out request is transmitted. If a log-out request is transmitted, the process moves to step 3021, and if it is not transmitted, the process returns to step 3001.

At step 3021, log-out processor 203 deletes from log-in control table 202 an identifier of the client terminal 1 contained in the log-out request transmitted at step 3020, and a user identifier and a user authority level that are specified in correspondence with the foregoing identifier. Thereafter, the process returns to step 3001. In the foregoing embodiment, a table is stored in user control file 41, in which each of a plurality of users using client terminals $1_1 \sim 1_n$ is specified in correspondence with a user authority level of the concerned user. A table is stored in the service control file 42, which represents the correspondence of user authority levels of a plurality of users using client terminals 1 with the process control rule for receiving the concerned service supply, as to each of the services that server 2 provides.

If a service supply request is made to a service that server 2 provides from a client terminal 1, a user authority level specified in correspondence with a user using the concerned client terminal 1 is retrieved from user control file 41, and thereafter a control process rule specified in correspondence with the concerned user authority level retrieved is retrieved, as to the foregoing service. Thereafter, if the process control rule detected indicates that the processing for the foregoing service supply request requires an approval, the processing in accordance with the concerned service supply request is made to be executed on condition that an approval by a user specified by the concerned process control rule is received.

Therefore, according to the present invention, in case a user of the client terminal 1 uses a service that the server 2 provides, even if an approval and consent by another user are required, the access to the foregoing service by the concerned user can be properly controlled.

On condition that the user authority level is given in correspondence with, for example, the position in an organization such as a company, in case a user is going to receive a service that the server 2 provides, even if an approval by the superior to the concerned user is required, the access to the foregoing service can properly be controlled.

In the disclosed embodiments, a user is made to input, for example, a user identifier and a password to execute a log-in processing, however, the invention is not limited to this. Instead of the password, the log-in processing may be executed by using a biological characteristic such as a fingerprint. That is, a table is made to be stored in advance in the user control file 41, in which a user identifier and a biological characteristic such as a fingerprint are specified in correspondence, and that the user identifier and the biological characteristic such as a fingerprint transmitted from the client terminal 1 are correspondent with each other is confirmed by the foregoing table; and thereby the log-in processing may be executed. Further, the biological characteristic such as a fingerprint can be read, for example, by a scanner.

Furthermore, any conversion program (for example, cipher program, unidirectional hash program, or the like) is made to be shared in advance, for example, by the client terminal 1 and the server 2, and the result that the conversion program converts a password is made to be stored in advance in the user control file 41. Thus, the log-in processing may be made by using the foregoing conversion result.

Furthermore, when a process control rule detected by the service control processor 205 indicates that an approval by a user having a certain user authority level is required, service approval request processor 206 makes an approval request to all the users stored in log-in control data 202, namely to all the logged-in users having the concerned user authority level, as for the client terminal 1 that the concerned user uses. However, in this case, out of the logged-in users having the concerned user authority level, as many users as the number of approvals required for providing the service are made to be selected, and the approval request may be made only to the users thus selected. Alternatively, the service approval request processor 206 may present a list of the logged-in users having the concerned user authority level to a user of client terminal 1 who has made a service supply request, make the user select some of the other users to whom the approval is to be requested, and make the approval request only to the users thus selected.

FIG. 16 illustrates one example of a display screen on the display portion 102, when service approval request processor 206 makes the user of client terminal 1 who has made a service supply request select some of the other users to whom the approval for the concerned service supply is to be requested. This example displays identifiers of users who have logged in and have the user authority level that can give the approval for the service supply request, and at the same time displays the number of approvals necessary for receiving the service supply (in this case, approval by one person); thereby prompting the user to choose as many user identifiers as the number of approvals required out of the user identifiers displayed. Furthermore, when a process control rule detected by service control processor 205 indicates that an approval by a user having a certain user authority level is required, and if the user having the concerned user authority level has not logged in, the approval request is designed not to be made for the this user. In other words, the approval request to the users having the concerned user authority level is made only to the users who have logged in by means of the real time communication. However, the present invention is not limited to this. For example, by applying the storage type communication such as an electronic mail, the approval request may be designed to be made when the users who have not yet logged in log in afterward. Also, once the necessary approval is received from on of the users who can give such approval, the approval request can be deleted from the display of the other users, thereby avoiding unnecessary responses. Such actions can be saved by the server in a log which can be examined by the users if they need to find out if approval was given and who gave such approval.

Figure 12:
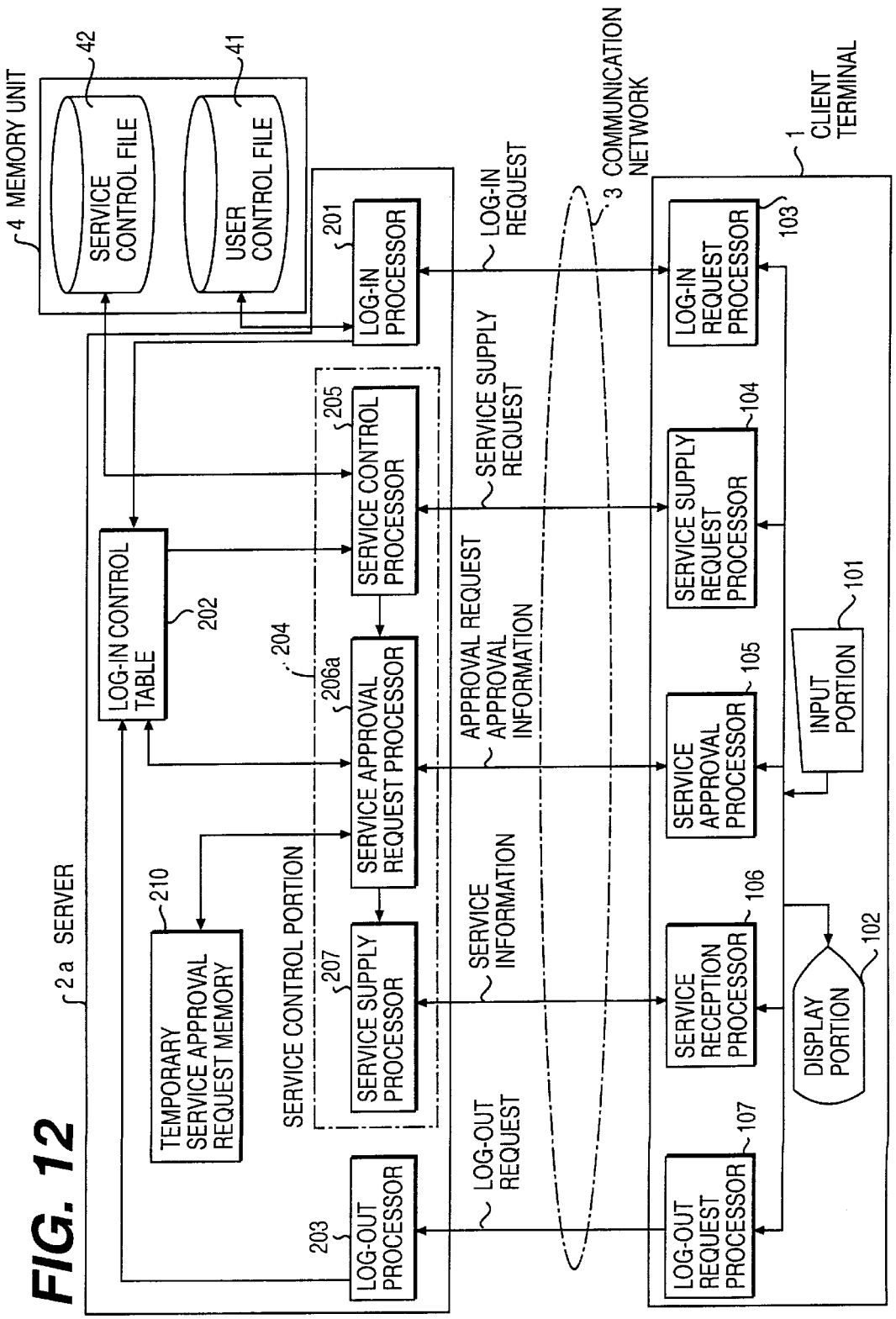
FIG. 12 is a functional block diagram for explaining one modified embodiment of the invention.

FIG. 12 is a functional block diagram for explaining a modified example of the above described embodiment. In FIG. 12, the client-server system uses a server 2a that is provided with a service approval request processor 206a instead of the service approval request processor 206, and in addition a temporary approval request memory 210 is provided. When a process control rule transmitted from service control processor 205 indicates that an approval by a user is required, service approval request processor 206a refers to the log-in control table 202, and transmits an approval request to client terminal 1 that the concerned user uses. If the identifier of the concerned user is not stored in log-in control table 202, namely, if the concerned user is not logged in, service approval request processor 206a relocates the approval request to the concerned user into temporary service approval request memory 210. When the identifier of the concerned user is stored in log-in control table 202, namely, when the concerned user is logged in, the service approval request processor 206a transmits the approval request to the concerned user that has been relocated into the temporary service approval request memory 210 to client terminal 1 specified in correspondence with the identifier of the concerned user in log-in control table 2020. The other operations are the same as those of the service approval request processor 206 shown in FIG. 6.

Figure 13:
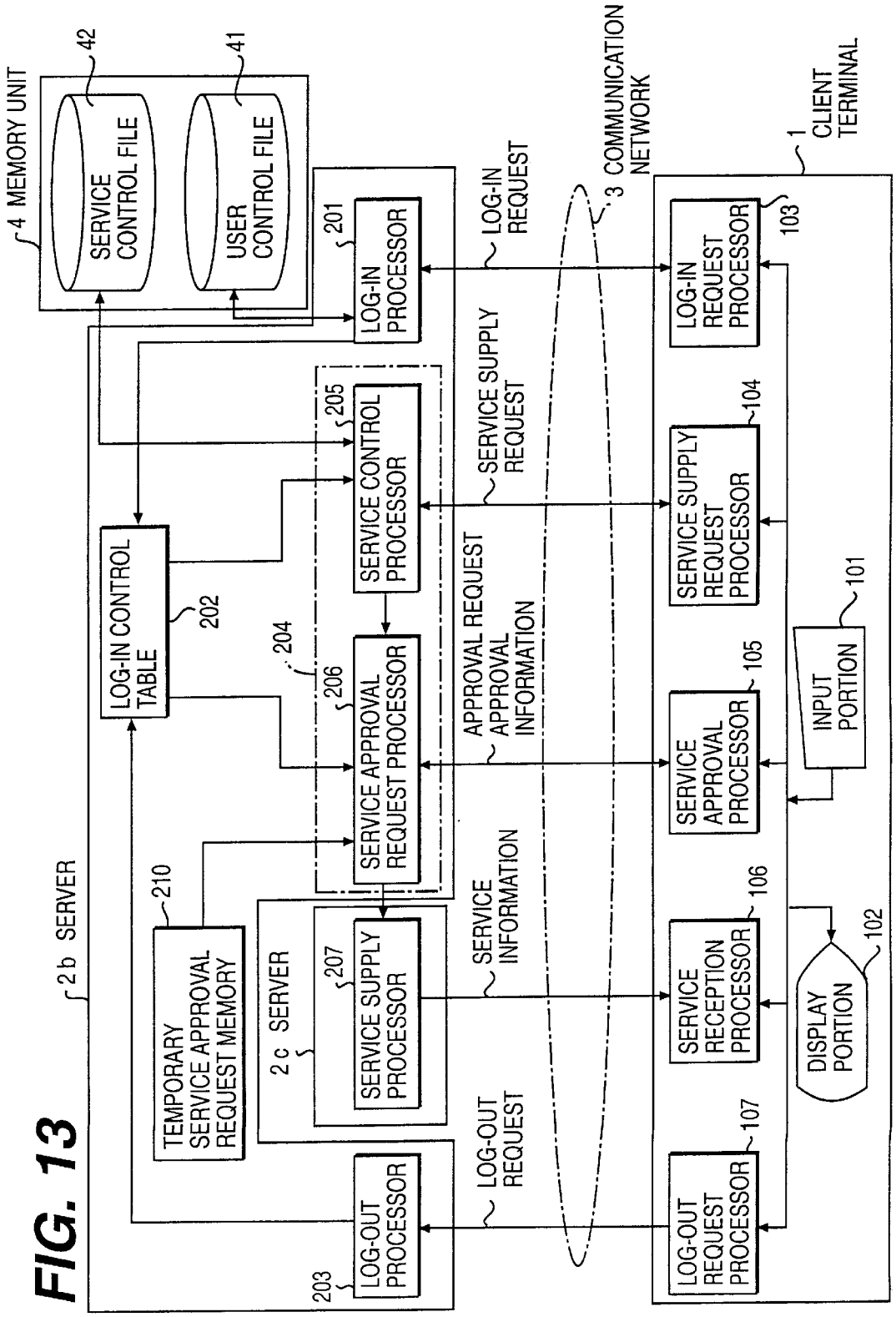
FIG. 13 is a functional block diagram for explaining another modified embodiment of the invention.

With the system thus arranged, it will be possible to transmit the approval request to the user, when the users who have not logged in log in later. Furthermore, according to this embodiment, the service supply and the service control are performed by one server; which, however, may be performed by different servers as in a modified example of this embodiment shown in FIG. 13. Furthermore, when there are a plurality of servers for providing the services, and if the service control processing for these plural servers is designed to be performed by one server, the user control file and the service control file can be unified; thus further reducing time and labor of the system manager. Also, the table for controlling the users who can receive the services that server 2 provides and the table for controlling the services that the users of client terminals 1 can use are individually stored in user control file 41 and service control file 42, respectively. However, the invention is not limited to this, and these tables may be integrated into a storage means.

According to the invention described above, when a user of the client terminal receives a service that the server provides, and even if an approval and consent by another user are required for a service supply, the access control to the foregoing service by the concerned user can properly be performed.

While the present invention has been described above in conjunction with the preferred embodiments, one of ordinary skill in the art would be enabled by this disclosure to make various modifications to the described embodiments and still be within the scope and spirit of the present invention as embodied in the appended claims.

What is claimed is:

1. A client-server system comprising a client terminal and a server that provides at least one service to said client terminal,
   wherein said client terminal comprises:
   transmission means for transmitting an instruction by a user using said client terminal to said server, the instruction including a user identifier of said user and a request to said server for providing a service being available by said server; and
   wherein said server comprises:
   control table storage means for storing a control table indicating relationship among a process control rule, a user identifier and a service being made available by said server,
   means for retrieving said process control rule from said control table storage means according to said transmitted user identifier and said service requested, and
   service supply control means for controlling a supply of said service based on said retrieved process control rule and transmitting a request of an approval of providing said service to a terminal used by a user specified by said user identifier and identification information in said identification information storage means, when said process control rule indicates a need of approval, to another client terminal used by a user listed in said control rule.

2. A client-server system according to claim 1, said server further comprises:
   service supplying means for executing a service;
   wherein said service supply control means instructs said service supplying means to supply a service specified by said request.

3. A client-server system according to claim 2:
   wherein said server further comprises identification information storage means for storing identification information of users using said client-server system so as to correspond with identification information of said client terminals; and
   wherein said client-server system further comprises another client terminal comprising;
   means for receiving said request from said service supply control means;
   means for displaying said request of approval of providing said service specified by said user identifier; and
   means for receiving decision transmitting said decision of the user using said another client terminal to said service supply control means.

4. A client-server system as claimed in claim 3, wherein:
   said service supply control means transmits identification information of a plurality of users to said client terminal, when said process control rule retrieved by said means for retrieving indicates that an approval is required and lists a plurality of identification information of users for an approval;
   said client terminal further comprises input means which receives an input of a selection information by said user using said client terminal for selecting at least one out of said identification information transmitted by said service supply control means; and
   said transmission means further transmits said selection information to said server; and
   said service supply control means transmits the request to the terminal specified by said selection information and identification information in said identification information storage means; and
   said identification information retrieval means retrieves an identification information of a client terminal specified in correspondence with an identification information of a user specified by said selection information.

5. A client-server system as claimed in claim 4, wherein said server further comprises a temporary identification storage means for temporarily storing an identification information of said user, and when an identification information of said user specified by said approval condition is not stored in said identification information storage means; and
   said identification information retrieval means retrieves an identification information of a client terminal specified in correspondence with an identification information of said user from said identification information storage means, when said identification information storage means receives the identification of said user specified by said process control rule.

6. In a system having a server and a plurality of client terminals connected via a communications network, a method of providing services to one user making a service request, the method comprising the steps of:
   evaluating the service request and determining if said one user can receive the service requested;
   determining if prior approval of another one or more users is needed;
   if approval is needed, providing the requested service to the one user if appropriate approval is granted from said another one or more users is needed; and
   obtaining approval by sending an approval request to the another one or more users upon consulting a file containing information about the location of the another one or more users.

7. The method according to claim 6, wherein only those users that are logged onto the communications network at the time of the service request are capable of receiving the approval request.

8. The method according to claim 7, wherein the one user selects certain ones of the users, who can give approval, to receive the approval request.

9. The method according to claim 6, wherein the step of evaluating includes consulting a user control file and the step of determining involves consulting a service control file which contains a relationship between the one user's authority level and corresponding approval information.

10. The method according to claim 6, further comprising the step of displaying to the one user a result of a needed approval.

11. A storage medium for storing a program for performing the steps of:
    evaluating a service request made by a user of a client terminal;

determining if the service request requires prior approval of one or more other users of different client terminals;

if approval is required, sending an approval request to said one or more other users;

if approval is given, providing the service corresponding to the service request to the user making the service request; and after evaluating the service request made by the user, consulting a control table having a user control file listing the user authority levels of a plurality of users using the client terminal from which the service request is made.

12. A storage medium according to claim 11, wherein the program also performs the step of:

after consulting the user control file of the control table, consulting the control table for a service file indicating which services are available to the user and if prior approval is needed for any service.

13. A server for providing at least one service to a client terminal, the server comprising:

control table storage means for storing a control table to indicate, as to each of at least said one service, a correspondence between identification information of a plurality of users using said client terminal or level information of the users specified by the concerned identification information and an approval condition to specify the presence of an approval for receiving the concerned service supply and in case of an approval being required an identification information of at least one user who can give the concerned approval, and service supply control means for controlling a supply of at least said one service to said client terminal;

wherein said service supply control means comprises:

approval condition retrieval means for retrieving an approval condition specified in correspondence with an identification information of the concerned client terminal or a level information of a user specified by the concerned identification information from said control table storage means, as to a service supply request of a service transmitted from said client terminal, and service supply execution means for executing a processing in accordance with the concerned service supply request, when an approval condition detected by said approval condition retrieval means indicates that an approval is not required, and when the approval condition thereby detected indicates that an approval is required, executing a processing in accordance with the concerned service supply request after receiving an approval by a user having an identification information of a user specified by the concerned approval condition.

14. A server as claimed in claim 13, wherein said service supply control means further comprises:

identification information storage means for storing identification information of users using the concerned client terminals, transmitted from each of a plurality of said client terminals, so as to correspond with identification information of the concerned client terminal, identification information retrieval means for retrieving, when an approval condition detected by said approval condition retrieval means indicates that an approval is required, an identification information of a client terminal specified in correspondence with an identification information of a user specified by the concerned approval condition from said identification information storage means, and informing means for informing that a user at a client terminal that transmitted said service supply request executed the concerned service supply request to a client terminal specified by an identification information of a client terminal detected by said identification information retrieval means; and wherein said service supply execution means executes a processing in accordance with the concerned service supply request, when an approval condition detected by said approval condition retrieval means indicates that an approval is required, and only when an approval consent information indicating to approve a processing in accordance with said service supply request is transmitted from a client terminal specified by an identification information of a client terminal detected by said identification information retrieval means.

15. A client-server system comprising at least one client terminal, a first server for providing at least one service to said client terminal, and a second server for controlling said first server, wherein said second server comprises:

control table storage means for storing a control table to indicate, as to each of at least said one service, a correspondence between identification information of a plurality of users using said client terminal or level information of the users specified by the concerned identification information and an approval condition to specify the presence of an approval for receiving the concerned service supply and in case of an approval being required an identification information of at least one user who can give the concerned approval, and service supply control means for controlling a supply of at least said one service to said client terminal;

wherein said client terminal comprises:

input means for receiving an instruction by a user using the concerned client terminal, such as an input of an identification information of a user and a service supply request of a service that said server provides, and transmission means for transmitting an instruction by said user that said input means received to said second server;

and wherein said service supply control means comprises:

approval condition retrieval means for retrieving an approval condition specified in correspondence with an identification information of the concerned user or a level information of a user specified by the concerned identification information from said control table storage means, as to a service specified by said service supply request by a user using the concerned client terminal, transmitted from said client terminal, and first server control means for controlling said first server to execute a processing in accordance with the concerned service supply request, when an approval condition detected by said approval condition retrieval means indicates that an approval is not required, and when the approval condition thereby detected indicates that an approval is required, controlling said first server to execute a processing in accordance with the concerned service supply request after receiving an approval by a user having an identification information of a user specified by the concerned approval condition.

16. A client terminal comprising:

input means for receiving an instruction by a user using the concerned client terminal, such as an input of an identification information of a user and a service supply request of a service that a server provides, transmission means for transmitting an instruction by said user that said input means received to said server, and display means for displaying an information relating to a service supply request made by a user of another client terminal, informed from said server; and the client terminal receiving a service that said server provides, wherein said input means also receives, as to a service supply request displayed on said display means made by a user at another client terminal, an input of an approval required for said server executing a processing in accordance with the concerned service supply request in accordance with a control table having a user control file listing user authority levels.

17. A storage medium for storing a program for performing the steps of:

evaluating a service request made by a user of a client terminal;

determining if the service request requires prior approval of one or more other users of different client terminals;

if approval is required, sending an approval request to said one or more other users;

if approval is given, providing the service corresponding to the service request to the user making the service request; and after evaluating the service request made by the user, consulting a control table having a service file indicating which services are available to the user and if prior approval is needed for any service.

* * * * *